(12) United States Patent
Kazmi et al.

(10) Patent No.: US 8,725,189 B2
(45) Date of Patent: May 13, 2014

(54) POWER CONTROL USING BIT RATE AND OUTSTANDING USER TRAFFIC

(75) Inventors: Muhammad Ali Kazmi, Bromma (SE); Jingyi Liao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 901 days.

(21) Appl. No.: 12/298,696

(22) PCT Filed: Apr. 23, 2007

(86) PCT No.: PCT/SE2007/050260
§ 371 (c)(1),
(2), (4) Date: Oct. 27, 2008

(87) PCT Pub. No.: WO2007/126373
PCT Pub. Date: Nov. 8, 2007

(65) Prior Publication Data
US 2009/0111400 A1    Apr. 30, 2009

(30) Foreign Application Priority Data
Apr. 27, 2006 (SE) ........................... 0600937

(51) Int. Cl.
*H04B 7/00* (2006.01)
*H04W 52/24* (2009.01)
*H04W 52/18* (2009.01)

(52) U.S. Cl.
CPC .............. *H04W 52/24* (2013.01); *H04W 52/18* (2013.01); *H04W 52/243* (2013.01)
USPC ......................................... 455/522; 370/235

(58) Field of Classification Search
USPC ........ 455/522, 127.1, 13.4, 69; 370/342, 335, 370/468, 395.42, 331, 332, 318
See application file for complete search history.

(56) References Cited

U.S. PATENT DOCUMENTS

| | | | | |
|---|---|---|---|---|
| 6,405,021 B1* | 6/2002 | Hamabe | ........................... | 455/69 |
| 6,493,541 B1* | 12/2002 | Gunnarsson et al. | ........... | 455/69 |
| 6,628,637 B1* | 9/2003 | Li et al. | ......................... | 370/342 |
| 6,728,233 B1* | 4/2004 | Park et al. | ...................... | 370/342 |
| 2002/0004407 A1 | 1/2002 | Simonsson | | |
| 2003/0169746 A1* | 9/2003 | Kitazawa et al. | ........ | 370/395.42 |
| 2004/0018849 A1 | 1/2004 | Schiff | | |

(Continued)

FOREIGN PATENT DOCUMENTS

EP 1043902 A2 10/2000

OTHER PUBLICATIONS

Chi Wan Sung et al A quality-based fixed-step power control algorithm with adaptive target threshold. Vehicular Technology, IEEE Transactions on, vol. 49, No. 4. pp. 1430-1439, Jul. 2000 p. 1438, lefthand, line 1-line 7 p. 1438 lefthand, line 1-line 7.

(Continued)

*Primary Examiner* — Edward Urban
*Assistant Examiner* — Golam Sorowar

(57) ABSTRACT

The present invention relates to cellular mobile radio systems, and more especially it relates to multi-cell interference-limited environments, such as Orthogonal Frequency Division Multiple Access, OFDMA, and Code Division Multiple Access, CDMA, cellular mobile radio systems. Particularly, it relates to transmission power allocation in such systems. Method and systems where transmission power is based on parameters directly affecting perceived user performance parameters are disclosed.

25 Claims, 7 Drawing Sheets

(56) References Cited

U.S. PATENT DOCUMENTS

| | | | |
|---|---|---|---|
| 2004/0090916 A1* | 5/2004 | Hosein | 370/235 |
| 2005/0043051 A1* | 2/2005 | Takano et al. | 455/522 |
| 2005/0186982 A1* | 8/2005 | Chen et al. | 455/522 |
| 2006/0268773 A1* | 11/2006 | Ranta-aho et al. | 370/329 |
| 2006/0268787 A1* | 11/2006 | Strutt et al. | 370/335 |

OTHER PUBLICATIONS

Qi Wang et al 'A new power control algorithm in CDMA systems,' Spread Spectrum Techniques and Applications, 2004, IEEE Eighth International Symposium on, vol., no., pp. 914-918, Sidney, Australia Aug. 30-Sep. 2, 2004 part III: Equations 12-15.

* cited by examiner

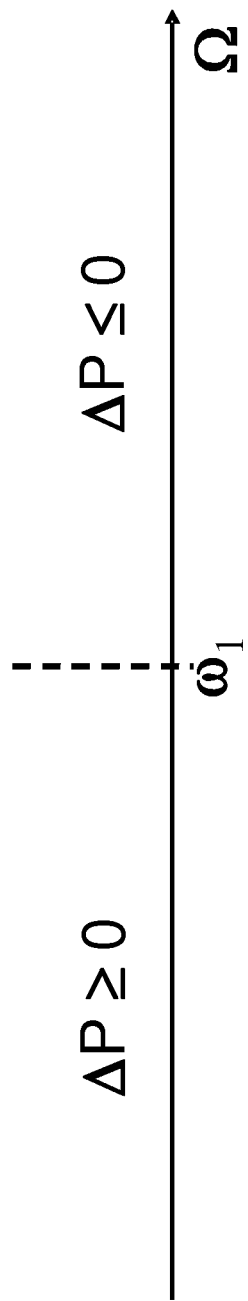
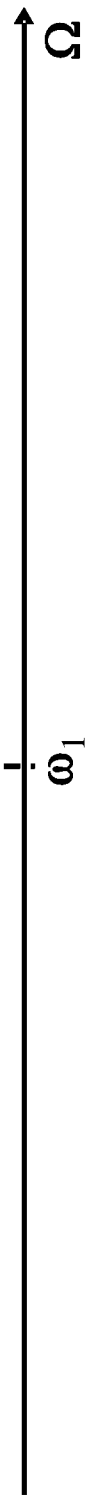
Fig. 4
Fig. 5

POWER CONTROL USING BIT RATE AND OUTSTANDING USER TRAFFIC

TECHNICAL FIELD

The present invention relates to cellular mobile radio systems, and more especially it relates to multi-cell interference-limited environments, such as Orthogonal Frequency Division Multiple Access, OFDMA, and Code Division Multiple Access, CDMA, cellular mobile radio systems. Particularly, it relates to transmission power allocation in such systems.

BACKGROUND

WCDMA and Cdma2000 are two non-exclusive examples of CDMA cellular mobile radio systems, providing radio communications to user equipment over a wide geographical coverage area composed of smaller sub-areas, cells, provided with radio coverage by various base stations. The sub-areas may overlap.

In a cellular system with multiple cells, user equipment <<UE1>>, <<UE2>>, <<UE3>>, <<UE4>>, <<UE5>> in the cells are served by one or more access points, APs, <<AP1>>, <<AP2>>, <<AP3>>, <<AP4>>, <<AP5>> as schematically illustrated in FIG. 1. Some or all of the access points may be subject to centralized control by means of a central node, e.g. a radio network controller, RNC.

Power allocation schemes dynamically allocate transmission power to users in cells in order to balance downlink co-channel interference and satisfy users' requirements in multi-cell environment. This is particularly important in multi-cell interference limited environments such as orthogonal frequency division multiple access, OFDMA, based systems with small normalized frequency reuse distances, e.g. reuse 1 or reuse 3. This is alternatively described as few frequency separated channel groups, when each cell is allocated on frequency channel group.

In OFDMA based systems the available bandwidth is sub-divided into several chunks of frequencies. A chunk is usually a two-dimensional radio resource defined in both time and frequency domain and comprises of orthogonal sub-carriers. Each user estimates the downlink channel quality on each chunk and reports the measured quality, e.g. channel quality indicator, CQI, to the network. The CQI can be measured by the UE on pilot symbols or any other suitable measurable signal that can depict the downlink instantaneous channel quality. Based on the reported CQI, the network can dynamically allocate the chunks to transmit data to the users in the downlink. The network transmits on the selected chunks at a certain power level. In CDMA systems and WCDMA systems, the entire carrier frequency is assigned to each user. However each user is allocated one or more channelization codes, which are orthogonal between cells.

Transmission power control, TPC, transmitting single or multiple TPC bits from a radio base station, RBS, to a mobile station, MS, informing the receiving party to increase or decrease, optionally by a specified amount, the transmission power level is previously known. It is also known to combine TPC bits from two different RBSes during handover from one RBS to another.

Transmission power control compensates for signal fading and interference dynamics at a receiver. Closed loop power control according to prior art is described in relation to FIG. 2. In closed loop power control received pilot channel signal to interference ratio, SIR, is measured at the receiving end (RBS for uplink). The level of the SIR equals the SIR or a quantized value thereof. The level of the SIR is compared with a target level. Information on the outcome of the comparison is fed back in the reverse direction in the form of TPC bits. Within this patent application, this is referred to as a regular transmission power control. Radio wave propagation and power control processing introduces a delay in the feedback loop. The transmitting end adjusts transmission power in response to received TPC bits. The receiving end receives, at a propagation delayed time, a pilot signal transmitted at the adjusted level, closing the power control loop. If the level of the measured SIR is larger than the target level the receiving end transmits a command towards the transmitting end (MS for uplink) to decrease the power at the transmitting end. If the level of the measured SIR is smaller than the target level the transmitting end is correspondingly instructed to increase the transmission power. Finally, if the level of the measured SIR is equal to the target level the receiving end receives no command, a command of no change of transmission power or interchanging commands of transmission power increase and decrease to keep the transmission power close to constant. The command to increase or decrease transmission power is sent by means of one or more TPC bits.

3rd Generation Partnership Project (3GPP): Technical Specification Group Radio Access Network, Physical Layer Procedures, 3G TS 25.214 v3.3.0, France, June 2000, specifies in section 4.3 uplink synchronization primitives, radio link set states and radio link monitoring. The technical specification also describes processing of multi-slot TPC commands. A rapid power increase is achieved by transmitting a series of TPC bits indicating power increase. Correspondingly, a rapid power decrease is achieved by transmitting a series of TPC bits indicating a power decrease. A slow or moderate speed power increase/decrease is achieved by transmitting TPC bits in an alternating series of increases and decreases. A net increase is achieved if the number of TPC bits indicating a power increase exceeds the number of TPC bits indicating a power decrease. Correspondingly, a net decrease is achieved if the number of TPC bits indicating a power decrease exceeds the number of TPC bits indicating a power increase. The larger the relative number of TPC bits indicating increases or decreases the faster the power increase and decrease, respectively.

European Patent Application EP0975185 discloses a method and base and mobile stations for transmitting, receiving and detecting TPC bits from a plurality of base stations during soft handover. The patent application combines received and detected TPC bits to be used for transmission power control of the mobile station.

European Patent Application EP0680160 also discloses a method of power control during soft handover. The mobile station uses the lowest transmission power level out of those indicated by two RBS's to keep transmission power at a low level.

International Patent Application WO9952310 relates to a method and apparatus for closed loop transmission power control in a mobile telecommunication system. Transmission power is compared to a target level. The difference is subdivided into power correction steps. The power correction steps are adjusted according to the closed loop power control.

International Patent Application WO9953630 reveals a method of power offset adjustment of transmission power control commands in relation to downlink information.

German Patent Application DE19850849 uses different step sizes when increasing and decreasing transmission power respectively.

C. Yih, E. Geraniotis, "Analysis of co-channel interference in multi-cell OFDM networks," Proc. IEEE PIMRC, vol. 2, pp. 544-548, September 1998, studies the impact of co-channel interference in multi-cell OFDMA.

G. Kulkami, M. Srivastava, "Subcarrier and Bit Allocation Strategies for OFDMA based Wireless Ad Hoc Networks," Proc. IEEE Globecom'02, pp. 92-96, 2002 investigates power allocation schemes for OFDMA cellular systems. Power allocation based on path loss is proposed for fixed wireless ad hoc networks based on OFDMA. The authors address the problem of assigning sub-carriers and bits to point-to-point wireless links in the presence of co-channel interference and Rayleigh fading. Their objective is to minimize the total transmitted power over the entire network while satisfying the data rate requirement of each link.

J. Zander, "Performance of Optimum Transmitter Power Control in Cellular Radio Systems," IEEE Trans. on Vehic. Techn., vol. 41, no. 1, pp. 57-62, September 1992, investigates interference management schemes for the control of co-channel interference for achieving acceptable carrier-to-interference (C/I) ratios. As performance measure, the interference (outage) probability is used, i.e., the probability that a randomly chosen link is subject to excessive interference.

J. Rohwer, C. Abdullah, A. Al-Osery "Power Control Algorithms in Wireless Communications," pp. 1-11, United States of America, March 2003, presents a review of published algorithms on power control for cellular systems. It is focused on Code Division Multiple Access, CDMA, systems, even if a small fraction of the reviewed literature pertains to Frequency Division Multiple Access, FDMA, and Time Division Multiple Access, TDMA.

U.S. Patent Application No. US20050105589, relates to a method for controlling downlink power transmitted from a base station to subscriber stations in a mobile communication system employing an Orthogonal Frequency Division Multiple Access (OFDMA) scheme, in which data is carried from the base station to the subscriber stations by sub-channels to each of which a plurality of sub-carriers are assigned. Power control based on CQI reports is proposed for OFDMA.

International Patent Application No. WO0074261, describes closed loop power control in a radio communication system, each station transmitting power control commands to other one or more stations. In response to the commands, the receiving station adjusts its output power in steps. By considering a plurality of received power control commands the receiving station may emulate the ability to use power control step sizes other than those it directly implements, for example step sizes smaller than its minimum, or step sizes between implemented step sizes.

None of the cited documents above discloses transmission power allocation related to user's outstanding traffic or measured user performance, such as user perceived bit rate, throughput or delay.

SUMMARY

Power allocation based on signal to interference ratio or signal to interference and noise ratio are difficult to apply appropriately. Such power allocation is generally designed to maintain certain signal specific parameters, such as SINR, and optimizes or regulates desired parameters, e.g. user perceived bit rate, throughput or delay, only indirectly. Further, closed loop power control based on signal to interference ratio is often combined with outer open loop transmission power control based on frame error rate, FER, in an attempt to improve performance. However, the convergence of outer loop transmission power control tends to be slow when it is needed most. Also, soft handover introduces further delay in the outer open loop convergence. If fixed power allocation is implemented as an alternative, this may lead to degradation of own-cell throughput due to transmitted downlink power being smaller than required for a particular communications link to be established or maintained, or the fraction of time when packet data can be transferred being too small in relation to user requirements. Often, providing a too small transmission power involves waste of resources, e.g. in cases when channel resources cannot be utilized at all or when limited channel resources are wasted during time for reallocating the resources between users.

It is, consequently, an object of preferred embodiments of the invention to provide a method and system of transmission power allocation that in a direct sense satisfies user demand or user requirements.

Also, an object of preferred modes of the invention is to provide a method and system of transmission power allocation in a radio communications system for radio transmissions between an access point and user equipment, based on measuring user packet bit rate or packet delay at the access point, thereby establishing a user perceived performance and measuring buffer size, thereby establishing an outstanding user traffic and allocating transmission power, based on the above two measures.

An object of one mode of the invention is to provide a method and system of transmission power allocation based on user traffic or on traffic outstanding in buffers.

Further, an object of embodiments of the invention is to provide a method and system of power allocation demonstrating short time required for convergence of transmission power and user performance in relation to required performance target.

Finally, an object of an embodiment of the invention is to provide a method and system of transmission power allocation that in a direct sense satisfies user demand or user requirements on bit rate, throughput or delay.

These objects are met by a method and system of allocating transmission power based directly on user performance parameters such as user traffic, rate requirements or delay requirements, preferably using particular one or more thresholds and a lookup table to select appropriate transmission power step size.

Preferred embodiments of the invention, by way of examples, are described with reference to the accompanying drawings below.

BRIEF DESCRIPTION OF DRAWINGS

FIG. 4 illustrates a non-exclusive first embodiment of the invention incorporating user bit rate as parameter in assessing transmission power increment P.

FIG. 5 illustrates a second non-exclusive embodiment of the invention where the (positive or negative) power control increment is affected by both user bit rate and buffer fill status.

DETAILED DESCRIPTION

According to the invention, the transmission power control is preferably localized to an access point. The invention then will not depend on whether the access point is under centralized control or not.

The access point adjusts transmission power in order to achieve certain quality targets, thereby mitigating, e.g., the effect of varying co-channel interference.

The device responsible for transmission power control, e.g. an access point, allocates transmission for various user equipment devices under control of the transmission power control device. The transmission power is adjusted at regular time intervals, preferably in quantized increments or decrements. The transmission power at a particular time-instant, t, can be expressed as $$P_{i,j,k}(t)=P_{i,j,k}(t-\tau)+\Delta P_{i,j,k}(t), \quad (1)$$

for user equipment device number i, channel j, and cell k, for time-intervals $m\tau \leq t \leq (m+1)\tau$, for integers $m \geq 0$. The transmission power increment $\Delta P_{i,j,k}(t)$ is adjusted to balance co-channel interference and system throughput as will be described in detail below.

The transmission power in equation (1) affects system throughput. In CDMA systems, WCDMA systems included, the downlink power control or $\Delta P$ is based on user equipment feedback, which depends upon one or more channel quality estimates.

According to a preferred embodiment of the invention, the impact on co-channel interference is compensated by introducing a scaling parameter, $\gamma$, for the incremental transmission power adjustment.

The interference compensated transmission power is then determined as $$P_{i,j,k}(t)=P_{i,j,k}(t-\tau)+\gamma \cdot \Delta P_{i,j,k}(t), \quad m\tau<t\leq(m+1)\tau, \quad (2)$$

for integers $m \geq 0$. The scaling parameter $\gamma$ makes the system more stable while satisfying cell or user performance requirements. The scaling parameter is preferably adaptive, e.g. such that the scaling parameter is smaller when the performance requirements are achieved and greater when performance requirements are not achieved.

Figure 1:
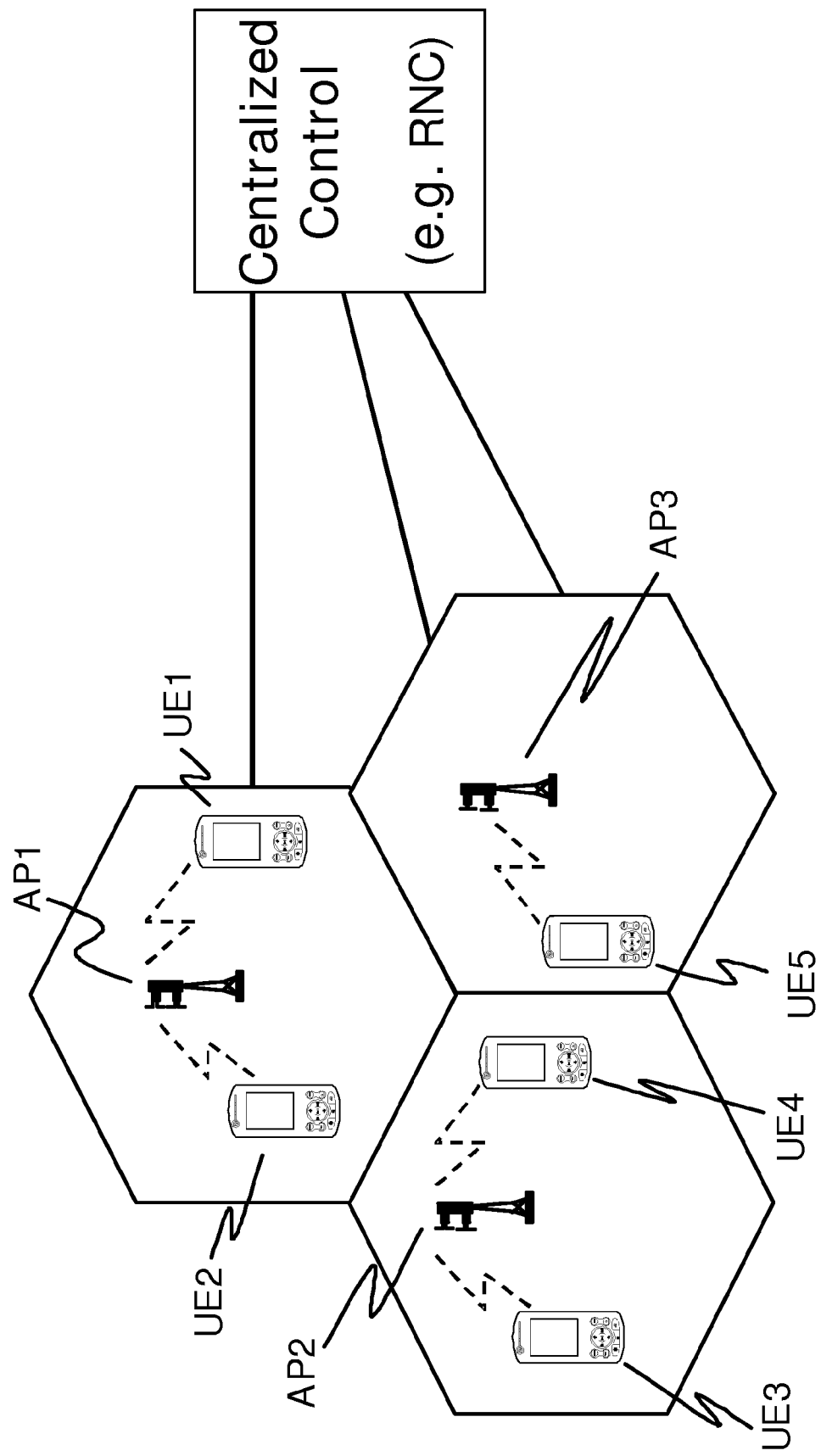
FIG. 1 schematically illustrates user equipment <<UE1>>, <<UE2>>, <<UE3>>, <<UE4>>, <<UE5>> in a cellular system with multiple cells served by one or more access points, APs, <<AP1>>, <<AP2>>, <<AP3>>, <<AP4>>, <<AP5>>.
Figure 2:
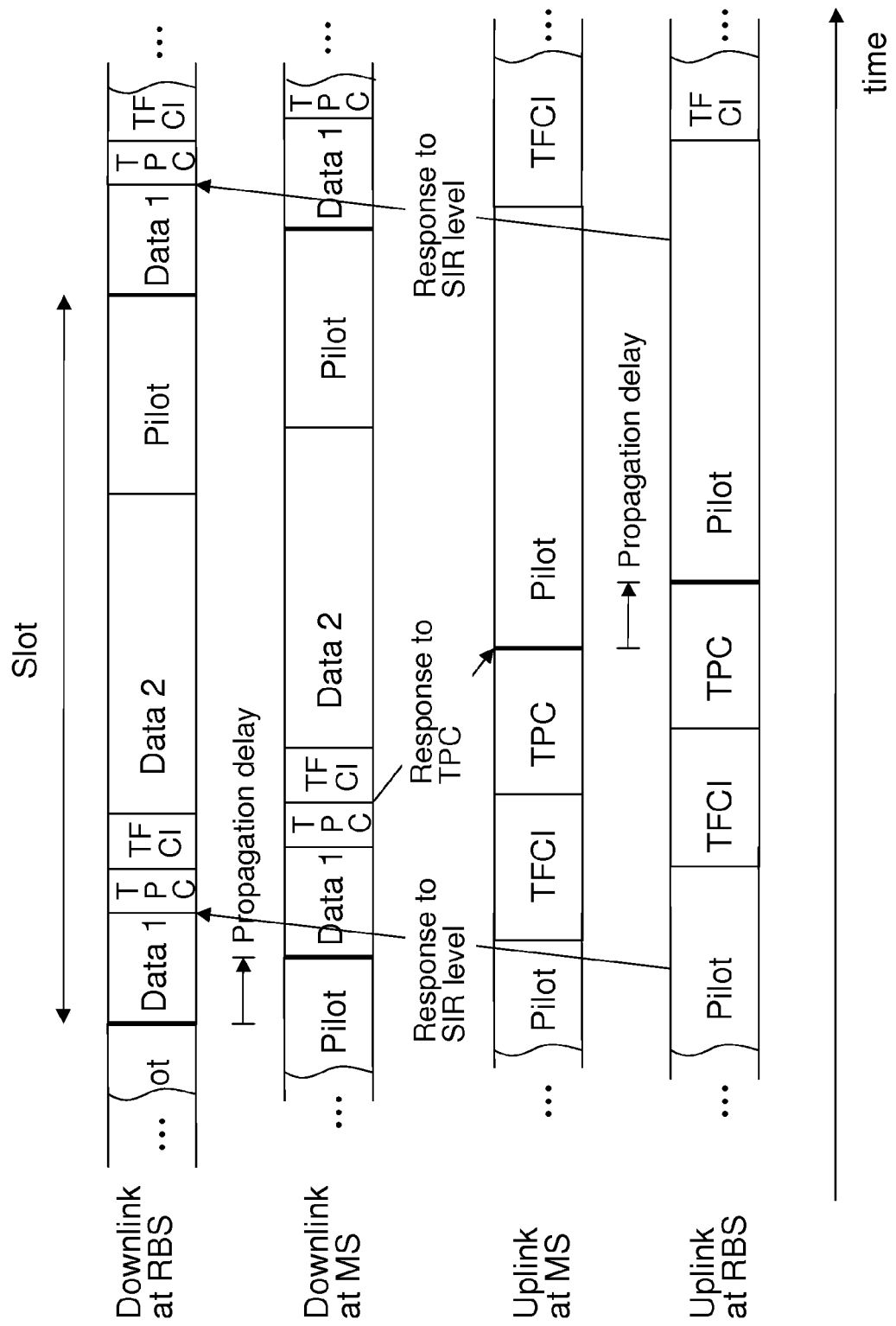
FIG. 2 provides a timing diagram for closed loop power control according to prior art.
Figure 3:
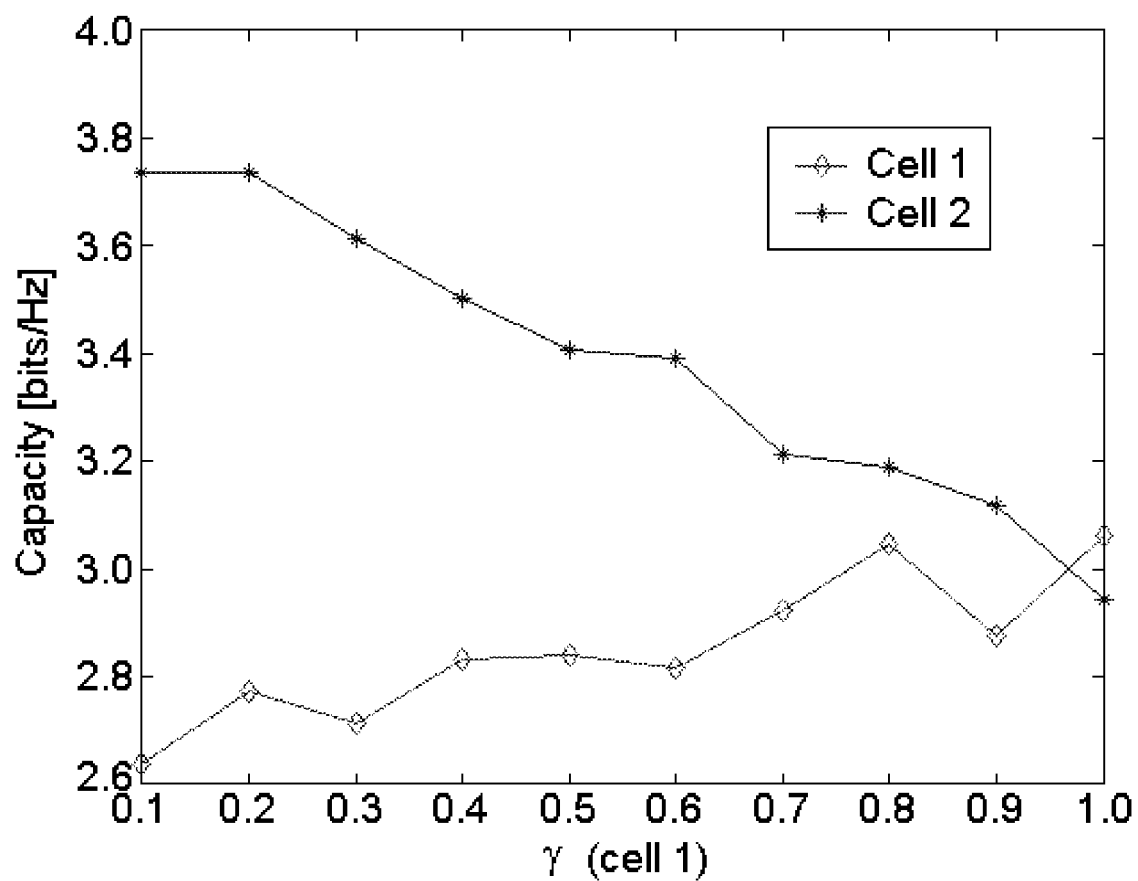
FIG. 3 illustrates the impact of varying the scaling parameter in a simple example system of two cells according to the invention.

FIG. 3 illustrates the impact of varying the scaling parameter $\gamma$ in a simple example system of two cells. In one of the two cells (cell 2) the scaling parameter is constant equal to 1, whereas in the other cell (cell 1) the scaling parameter <<$\gamma$ (cell 1)>> is varied between 0.1 and 1. The impact on system capacity in terms of throughput in bits/Hz for the various cells <<cell 1>>, <<cell 2>> influences capacity of the each of the cells and the overall capacity determined as the sum of capacities of the individual cells. This simple example illustration also demonstrates that capacities in various cells could be balanced in relation to respective demands of different cells or cell areas. By appropriately controlling access points, APs, accordingly, cell throughput can be controlled to satisfy target capacities.

The positive or negative power increment $\Delta P$ is preferably determined depending on measured user performance, user outstanding traffic or both.

User measured performance according to the invention distinguishes from prior art measures, such as frame error rate, FER, or signal to interference ratio or signal to interference and noise ratio, SINR. The prior art measures are related to FER and SINR targets involving extensive delays in outer loop convergence, particularly for frame error rates in the range 1% or less, and do not directly map to user satisfaction, e.g. in terms of bit rate or packet delay. User measured performance according to the invention directly reflects one or more user satisfaction parameters, non-exclusively including user perceived bit rate, delay or latency. The user measured performance can be, e.g., instantaneous one or more parameters, an average over a selected time frame, a weighted or filtered average over a selected time frame, a median value, a percentile or a confidence interval.

User outstanding traffic at a particular time instant is the amount of user traffic, at that time instant, stored in one or more buffers waiting for transmission. The user outstanding traffic can e.g. be expressed in number of bytes or bits in the one or more buffers. For practical reasons, the processing and signaling interval for determining user outstanding traffic cannot be infinitely short.

FIG. 4 illustrates a non-exclusive first embodiment of the invention incorporating user bit rate as parameter in assessing transmission power increment $\Delta P$ for power (re-)allocation. In the figure $\Omega$ represents user bit rate and $\omega_1$, represents a particular threshold. When user bit rate is greater than the threshold, the transmission power increment is smaller than or equal to zero, and when user bit rate is smaller than the threshold, $\omega_1$, the transmission power increment is smaller than or equal to zero, i.e. effectively being a decrement. Preferably the particular threshold, $\omega_1$, corresponds to user target bit rate or required bit rate, to be fulfilled.

FIG. 5 illustrates a second non-exclusive embodiment of the invention where the (positive or negative) power control increment is affected by both user bit rate and buffer fill status. As for the first embodiment, the sign of the transmission power increment (i.e. whether it is an absolute increment or a decrement) is affected by whether a user bit rate requirement is fulfilled or not. However the magnitude of the transmission power increment is determined by both bit rate and buffer fill status. In FIG. 5 the magnitudes are represented by quantized values. For bit rates exceeding the bit rate requirement, $\omega_1$, the power increments are $\Delta \rho_{ij} \leq 0$, where i represents a buffer fill-status in a first interval, $i \in [1,M]$, and j represents a bit rate in a second interval, $j \in [1,N]$, for positive integers M and N. The greater the buffer fill level, the smaller the magnitude of the transmission power increment, $|\Delta \rho_{ij}|$. For bit rates smaller than the bit rate requirement, $\omega_1$, the power increments are $\Delta \sigma_{ij} \geq 0$, where i represents a buffer fill-status in the first interval, $i \in [1,M]$, and j represents a bit rate in the second interval, $j \in [1,N]$. For these bit rates, the greater the buffer fill level, the greater the allocated magnitude of the transmission power increment, $|\Delta \sigma_{ij}|$. The transmission power allocation or transmission power increase/decrease is preferably achieved by storing an allocation map in a memory for table lookup, mapping respective bit rate intervals and buffer fill status intervals to power allocation increments/decrements $\Delta \rho_{ij}$, $\Delta \sigma_{ij}$. The allocation is graphically illustrated in FIG. 5. In another mode of the invention there are three or more thresholds defining intervals, with predefined transmission power increases/decreases for the various intervals.

Figure 6:
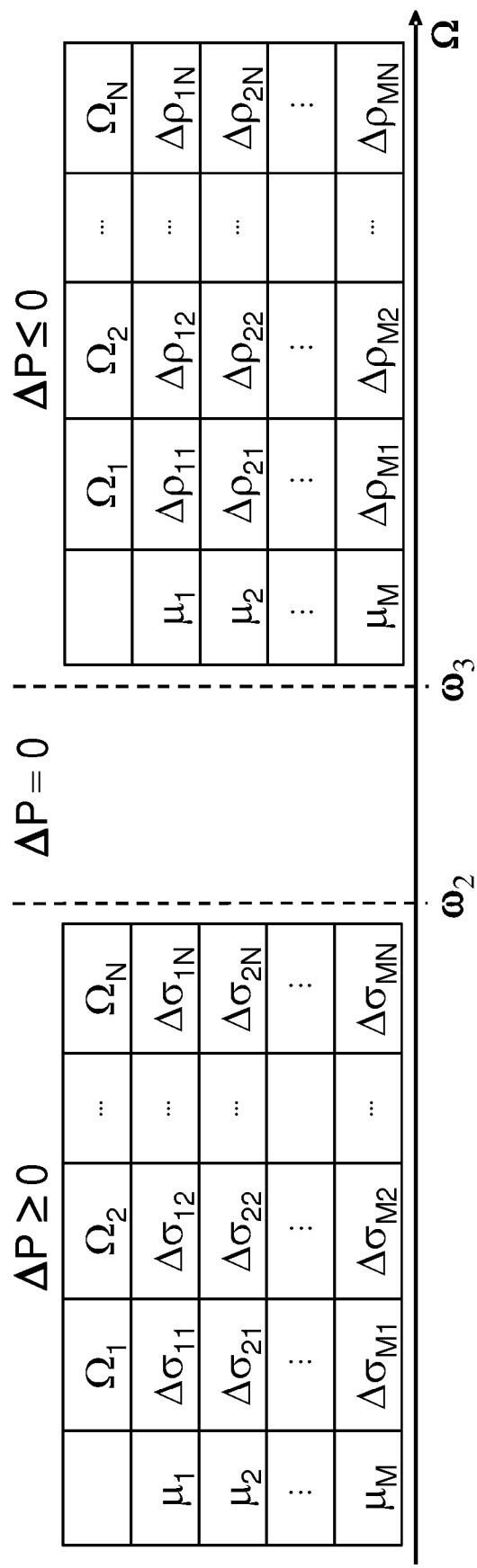
FIG. 6 illustrates schematically a third non-exclusive embodiments with more than one threshold affecting power allocation.

According to a third non-exclusive embodiment, schematically illustrated in FIG. 6, more than one threshold is used for the power allocation. Various applications and protocols adapt to variations in available bit rates. Non-exclusive examples of applications and protocols are Adaptive Multi-Rate, AMR, speech encoding and streaming protocols. According to the third embodiment no bit rates are allowed to vary within a range without requiring transmission power adjustments. In FIG. 6, the bit rate is allowed to vary between the lower and upper thresholds $\omega_2$ and $\omega_3$, respectively. The multi-threshold embodiment provides increased flexibility in terms of selecting power increment/decrement. As for FIGS. 4 and 5, $\Omega$ refers to bit rate, e.g. measured over a time interval; $\mu$ is buffer fill status; $\Delta\rho_{ij}$ and $\Delta\sigma_{ij}$ refer to power allocation increments/decrements.

For bit rates $\Omega$ greater than the lower threshold $\omega_2$ and smaller than the upper threshold $\omega_3$, transmission power is kept constant within the precision of power control. If the bit rate $\Omega$ is greater than $\omega_3$, transmission power is decreased ($\Delta P \leq 0$). Preferably, the transmission power decrease is selected from predefined quantized values $\Delta\rho_{ij}$. The greater the buffer fill status, the smaller the magnitude of the transmission power decrease $|\Delta\rho_{ij}|$. If the bit rate is smaller than $\omega_2$, transmission power is increased. Preferably, the transmission power decrease is again selected from predefined quantized values $\Delta\sigma_{ij}$. For these bit rates, the greater the buffer fill status the greater the magnitude of the transmission power decrease $|\Delta\sigma_{ij}|$. As for the embodiment described in relation to FIG. 5, the transmission power allocation or transmission power increase/decrease is preferably achieved by storing an allocation map in a memory for table lookup, mapping respective bit rate intervals and buffer fill status intervals to power allocation increments/decrements $\Delta\rho_{ij}$, $\Delta\sigma_{ij}$.

An alternative or complement to user perceived bit rate as a parameter for transmission power control is user perceived transmission delay. To some extent the transmission delay is inversely proportional to the bit rate. Consequently, the abovementioned power allocation can essentially be applied by replacing or supplementing bit rate with the inverse of user perceived transmission delay. In the latter case, the allocation process increases the dimension of consideration by one, the bit rate and delay then spanning a two-dimensional plane.

The bit rate compared with the one or more targets is preferably time-averaged over a time interval to a mean value.

Figure 7:
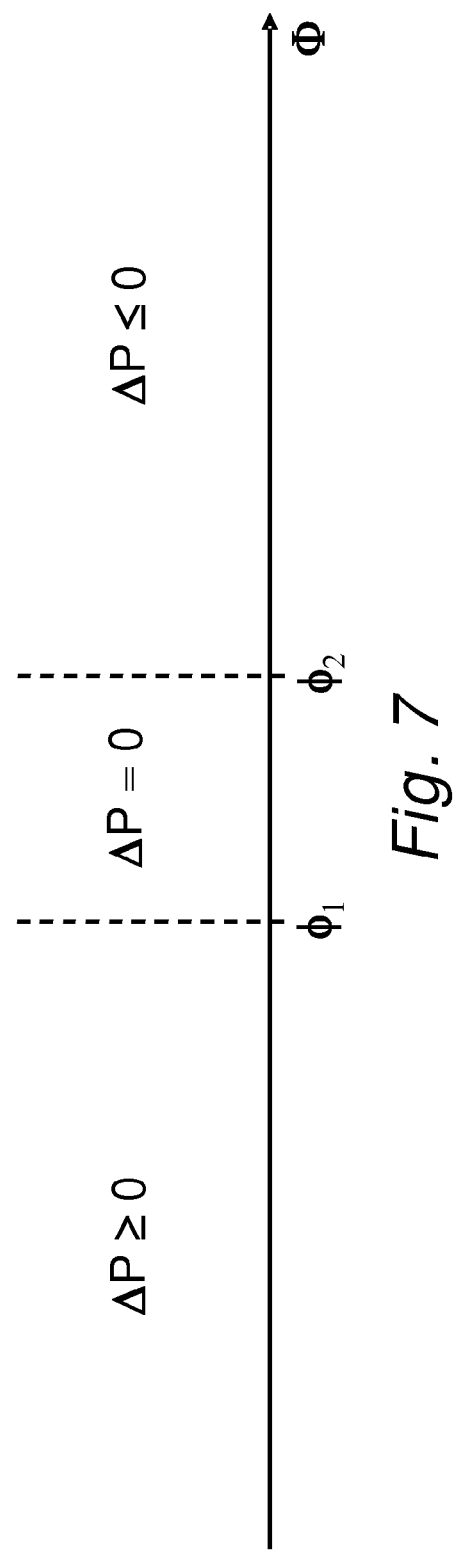
FIG. 7 illustrates schematically multi-threshold transmission power allocation for an example allocation scheme with two thresholds.

FIG. 7 illustrates schematically multi-threshold transmission power allocation for an example allocation scheme with two thresholds. User equipment perceived delay, $\Phi$, is measured performance. If measured delay $\Phi$ is smaller than a lower threshold, $\phi_1$, then a transmission power increment not greater than zero is allocated, i.e. in effect a transmission power decrease. For such delays, the smaller the delay, $\Phi$, the greater the magnitude of the decrease. If measured delay is greater than an upper threshold $\phi_2$, $\phi_2 \geq \phi_1$, then a transmission power increase not smaller than zero is allocated, i.e. in effect an absolute transmission power increase is allocated. For such delays, the greater the delay, $\Phi$, the greater the transmission power increase.

Figure 8:
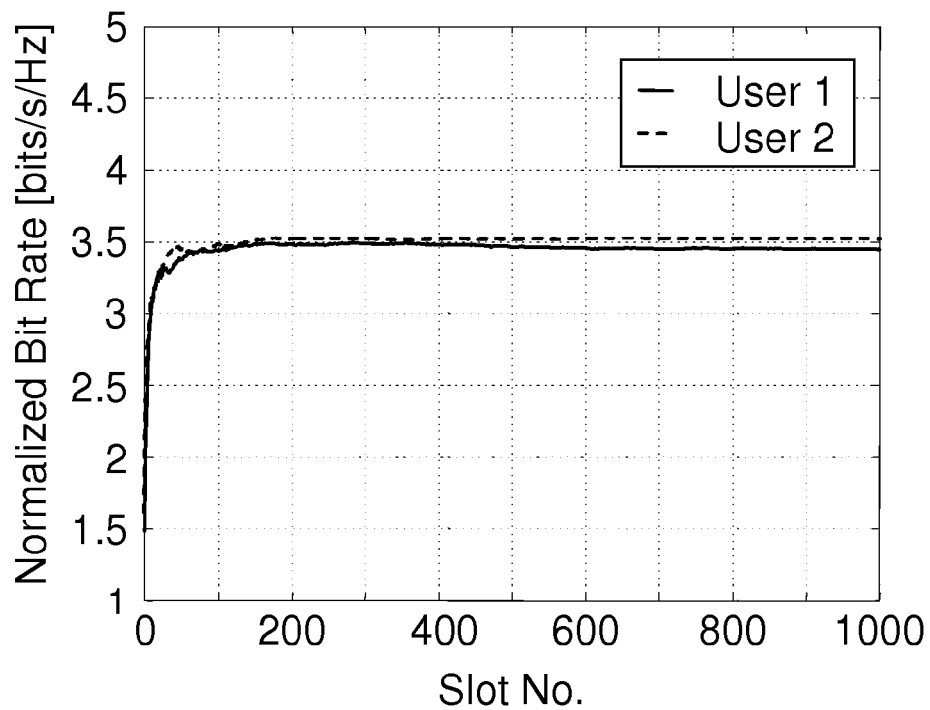
FIG. 8 illustrates normalized bit rate versus time, in terms of time slot number.
Figure 9:
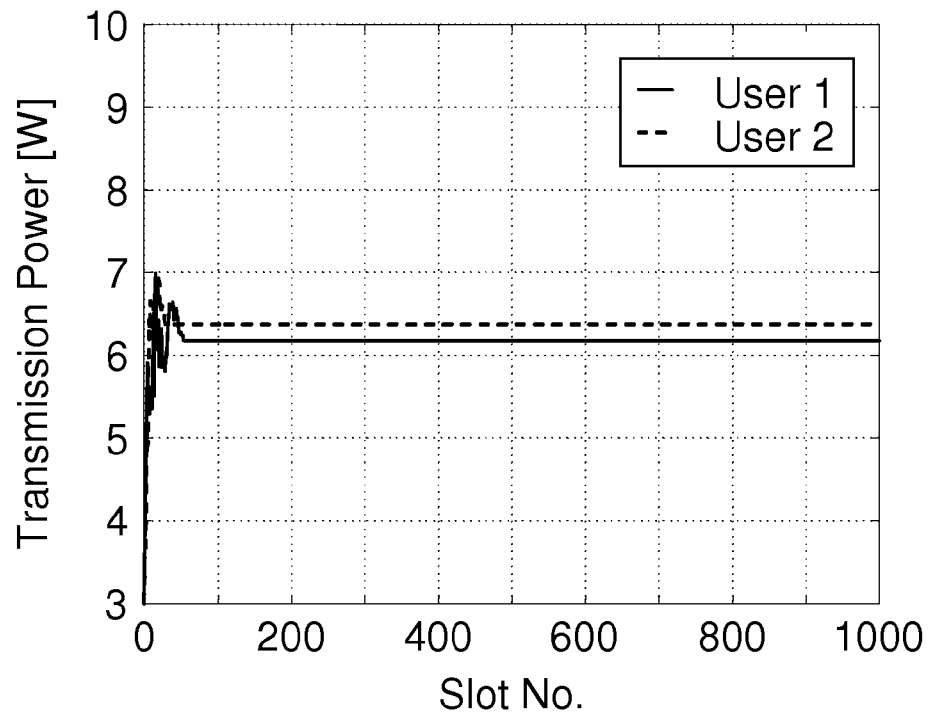
FIG. 9 illustrates transmission power versus time, in terms of time slot number.

For reasons of stability, transmission power allocation should adapt to variations over time. Performance achievements including bit rate and transmission power convergence have been validated. Once power allocation has converged after a detected bit rate change, it remains essentially constant in static or quasi-static environment. This also holds for multi-threshold embodiments with a sufficiently small interval between rate thresholds. Respective FIGS. 8 and 9 illustrate normalized bit rate and transmission power convergence versus time, in terms of time slot number, for an example situation with two active users <<User 1>>, <<User 2>>. In the example, transmission power of both users is adjusted in accordance with the third embodiment with two thresholds to meet specified target bit rate performance in a mean sense. Once transmission power and bit rate has converged, they remain stable. The stability region corresponds to the no-change region of the two-threshold scheme with small separation between the thresholds. Correspondingly, converging and stable results of transmission power and normalized bit rate are achieved also when the target bit rates are different.

Figure 10:
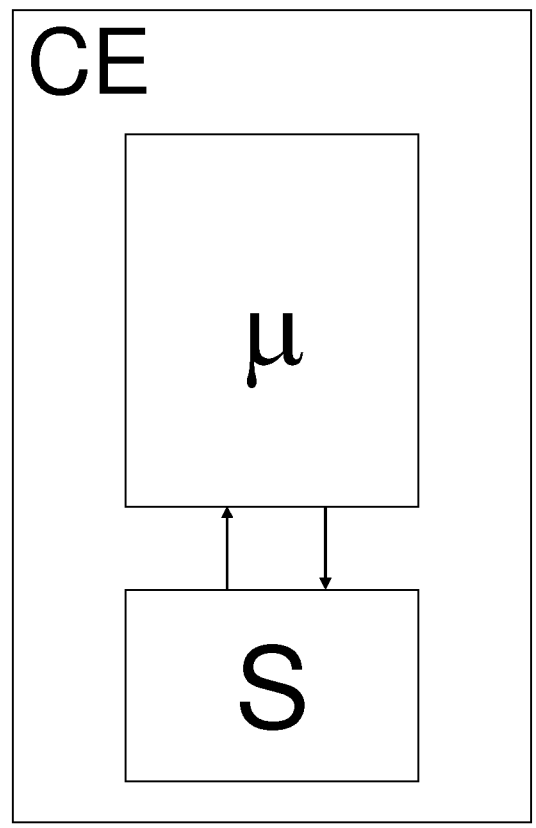
FIG. 10 illustrates schematically selected block elements of a communications entity according to the invention.

FIG. 10 illustrates schematically selected block elements of a communications entity <<CE>> according to the invention. The communications entities constitute or are included in e.g. access points or user equipment. The communications entity comprises processing means <<$\mu$>> and storage means <<S>>. The storage means can be realized, e.g., using state of the art memory technologies or magnetic media. The processing means are adapted for allocating transmission power based directly on measured user perceived performance as explained above. Preferably, the processing means is capable of scaling transmission power increments by a scaling parameter.

Included in or connected to the processing means, the invention comprises means for storing <<S>> of, e.g. one or more lookup tables comprising transmission power levels or increments/decrements for various performance measurement levels, e.g. concerning bit rate, throughput or delay.

According to a preferred embodiment, the communications entity is also arranged to compare measured user perceived performance with one or more specified user performance requirement. Measurements of user perceived performance can be conducted by the communication entity, CE, or determined externally and input to the communications entity. Non-excluding examples of user performance are perceived bit rate, throughput or delay. In a preferred realization of the invention transmission power is determined in relation to amount of outstanding traffic, irrespective of the outstanding traffic is stored at the same location as the communications entity or not. This has been described in some detail above.

A person skilled in the art readily understands that the receiver and transmitter properties of an AP or user equipment are general in nature. The use of concepts such as AP, MS, RBS, RNC, OFDMA or CDMA within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to mobile stations without a subscriber identity module, SIM, as well as user equipments including one or more SIMs.

The invention is not intended to be limited only to the embodiments described in detail above. Changes and modifications may be made without departing from the invention. It covers all modifications within the scope of the following claims.

The invention claimed is:

1. A method of transmission power allocation in a radio communication system for radio transmission between an access point and user equipment, the method comprising:
   measuring user packet bit rate or packet delay at the access point, thereby establishing a user perceived performance;
   measuring an amount of user outstanding traffic based on traffic stored in a buffer awaiting transmission;
   identifying a transmission power increment that depends on the measured user perceived performance and the measure amount of user outstanding traffic; and allocating transmission power based on the identified transmission power increment by changing the transmission power by the transmission power increment, wherein a sign of the transmission power increment is determined based on the user perceived performance, and wherein a magnitude of the transmission power increment is determined based on the amount of the user outstanding traffic, wherein said transmission power increment is scaled by a scaling parameter, the magnitude of said scaling parameter being determined based on said user perceived performance and said amount of user outstanding traffic.

2. The method according to claim 1, wherein the magnitude of said transmission power increment is further based on the user perceived performance.

3. The method according to claim 1 further comprising:
allocating one or more transmission power changes by means of a table lookup.

4. The method according to claim 1 further comprising:
comparing the user perceived performance to one or more specified user performance requirements.

5. The method according to claim 1, wherein the user perceived performance is an average value, a weighted or filtered average, a median value, a percentile or a confidence interval of the measured user packet bit rate or packet delay.

6. The method according to claim 1 further comprising:
allocating a transmission power increase if the user perceived performance does not satisfy, or does not outperform, a specified performance level.

7. The method according to claim 1 further comprising:
allocating a transmission power decrease if the user perceived performance satisfies, or outperforms, a specified performance level.

8. The method according to claim 1 further comprising:
allocating an unaltered transmission power if the user perceived performance satisfies, or equals, a specified performance level.

9. The method according to claim 1 further comprising:
allocating an unaltered transmission power if the user perceived performance satisfies, or outperforms, a first specified performance level but does not satisfy or does not outperform a second specified performance level.

10. The method according to claim further comprising:
basing the magnitude of a transmission power increase or a transmission power decrease on the amount of user outstanding traffic.

11. The method according to claim 10 wherein basing the magnitude of a transmission power increase or a transmission power decrease on the amount of user outstanding traffic comprises:
positively correlating the magnitude of a transmission power increase with the amount of the user outstanding traffic.

12. The method according to claim 10 wherein basing the magnitude of a transmission power increase or a transmission power decrease on the amount of user outstanding traffic comprises:
negatively correlating the magnitude of a transmission power decrease with the amount of the user outstanding traffic.

13. A communication entity comprising processing means for transmission power allocating in a radio communication system for radio transmission between one or more access points and user equipment, the communication entity comprising:
a processing means adapted to:
measure user packet bit rate or packet delay at the access point, thereby establishing a user perceived performance;
measure an amount of user outstanding traffic based on traffic stored in a buffer awaiting transmission;
identify a transmission power increment that depends on the measured user perceived performance and the measured amount of user outstanding traffic; and
allocate transmission power based on the identified transmission power increment by changing the transmission power by the transmission power increment,
wherein the sign of the transmission power increment is determined based on the user perceived performance, and wherein the magnitude of the transmission power increment is determined based on the amount of user outstanding traffic,
wherein said transmission power increment is scaled by a scaling parameter, and the magnitude of said scaling parameter is determined based on the said user perceived performance and said user outstanding traffic.

14. The communication entity according to claim 13 wherein the processing means is adapted for allocating one or more transmission power changes by means of a table lookup.

15. The communication entity according to claim 13 wherein the processing means is further adapted for comparing the user perceived performance with one or more specified user performance requirements.

16. The communication entity according to claim 13 wherein the user perceived performance is either a user perceived bit rate, a throughput or a delay.

17. The communication entity according to claim 13 wherein the user perceived performance is an average value, a weighted or filtered average, a median value, a percentile or a confidence interval of the measured user packet bit rate or packet delay.

18. The communication entity according to claim 13 wherein the processing means is adapted for allocating a transmission power increase if the user perceived performance does not satisfy, or does not outperform, a specified performance level.

19. The communication entity according to claim 13 wherein the processing means is adapted for allocating a transmission power decrease if the user perceived performance satisfies, or outperforms, a specified performance level.

20. The communication entity according to claim 13 wherein the processing means is adapted for allocating unaltered transmission power if the user perceived performance satisfies, or equals, a specified performance level.

21. The communication entity according to claim 13 wherein the processing means is adapted for allocating unaltered transmission power if the user perceived performance satisfies, or outperforms, a first specified performance level but does not satisfy or does not outperform a second specified performance level.

22. The communication entity according to claim 13 wherein the processing means is adapted to base a magnitude of a transmission power increase or a transmission power decrease on the amount of the user outstanding traffic.

23. The communication entity according to claim 22 wherein the processing means is adapted to base the magnitude of a transmission power increase or a transmission power decrease on the amount of the user outstanding traffic by determining a magnitude of a transmission power increase that is positively correlated with the amount of the user outstanding traffic.

24. The communication entity according to claim 22 wherein the processing means is adapted to base the magnitude of a transmission power increase or a transmission power decrease on the amount of the user outstanding traffic by determining a magnitude of a transmission power decrease that is negatively correlated with the amount of the user outstanding traffic.

25. The communication entity according to claim 13 wherein the communication entity is included in, or is, an access point.

* * * * *

UNITED STATES PATENT AND TRADEMARK OFFICE
CERTIFICATE OF CORRECTION

PATENT NO. : 8,725,189 B2
APPLICATION NO. : 12/298696
DATED : May 13, 2014
INVENTOR(S) : Kazmi et al.

It is certified that error appears in the above-identified patent and that said Letters Patent is hereby corrected as shown below:

In the specification

In Column 6, Line 29, delete "$\omega_1$, represents" and insert -- $\omega_1$ represents --, therefor.

In the claims

In Column 9, Line 44, in Claim 10, delete "claim further" and insert -- claim 1 further --, therefor.

Signed and Sealed this
Twelfth Day of January, 2016

Michelle K. Lee
*Director of the United States Patent and Trademark Office*